INVENTOR.
Moshe J. Lubin

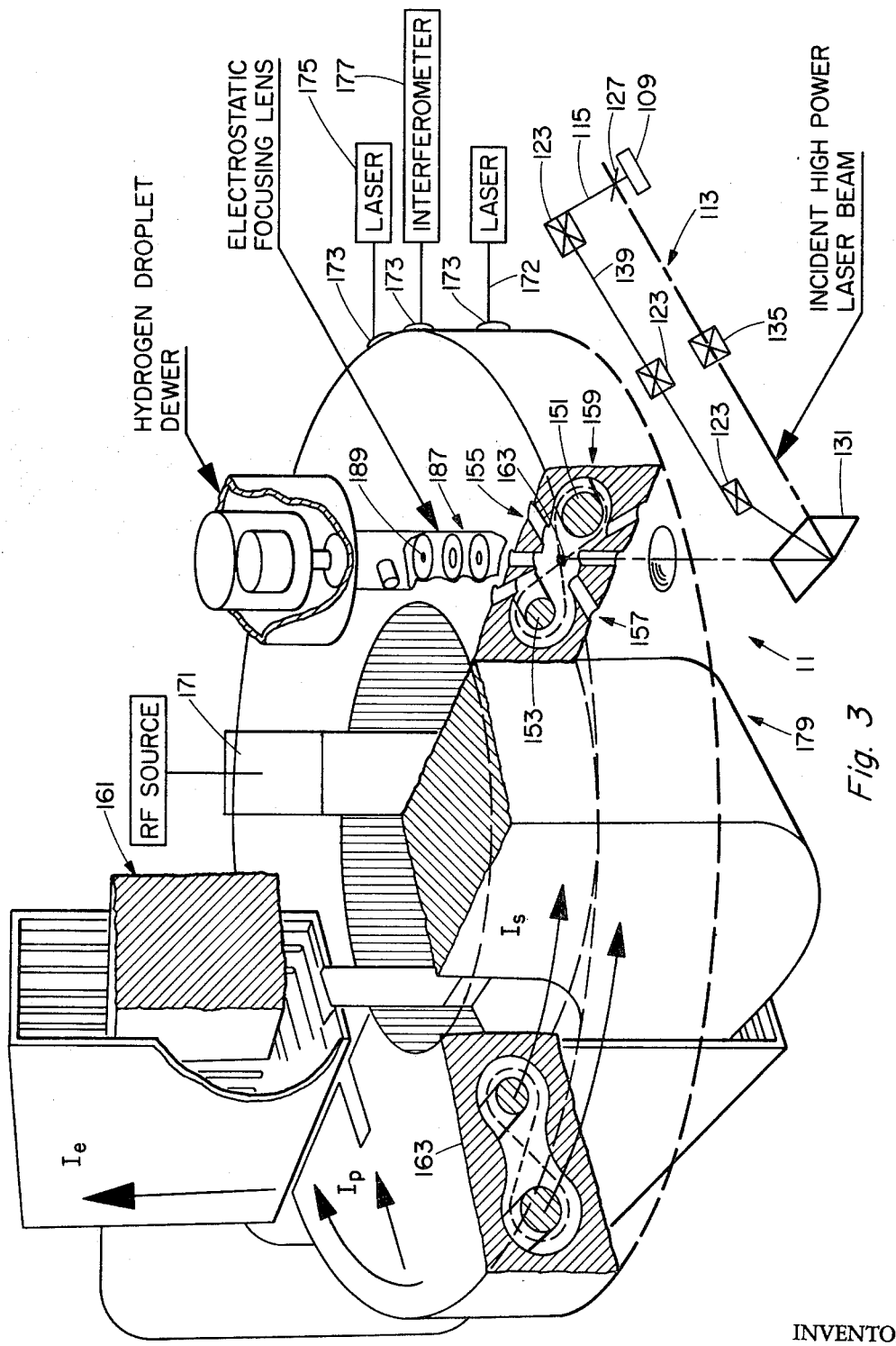

United States Patent Office 3,723,246
Patented Mar. 27, 1973

3,723,246
PLASMA PRODUCTION APPARATUS HAVING DROPLET PRODUCTION MEANS AND LASER PRE-PULSE MEANS
Moshe J. Lubin, Rochester, N.Y., assignor to the United States of America as represented by the United States Atomic Energy Commission
Filed May 27, 1971, Ser. No. 147,489
Int. Cl. G21b 1/00
U.S. Cl. 176—1                          10 Claims

ABSTRACT OF THE DISCLOSURE

Apparatus and method for producing a freely expanding high temperature plasma from a high density target that is irradiated with laser light by a tailored laser pulse. Means are described for producing a tailored laser light pulse and a tailored target for producing a laser-target interaction. Laser-target micro-explosions are also contemplated.

CROSS-REFERENCE TO RELATED APPLICATIONS

S.N. 211,275, filed Dec. 23, 1971
 Inventor: Robert L. Hirsch
 Title: Method of Mounting a Fuel Pellet In A Laser Excited Fusion Reactor
 Assigned to the assignee of this application
S.N. 155,012, filed June 21, 1971.
 Inventor: Alan F. Haught
 Title: Hybrid Laser Target Neutral Beam Injection Fusion System
 Assigned to the assignee of this invention

BACKGROUND OF THE INVENTION

In the field of physics a need exists for a plasma produced from a high density target that is irradiated by laser light. One concept for producing such a plasma is disclosed in U.S. Pat. 3,378,446. This concept, however, requires the compression of a target by a plurality of simultaneous, high intensity laser light beams. Additionally, it is advantageous to "tailor" a target for laser-target interaction, and to "tailor" laser light beams for laser-target interaction to produce a freely expanding plasma and/or a laser-target micro-explosion.

It is an object of this invention, therefore, to provide "tailored" laser light beams for producing a freely expanding high temperature plasma;

It is another object to provide means for producing "tailored" targets for laser-target interactions;

It is a further object to provide improved means for releasing a target for laser-target interactions;

It is a still further object to provide laser-target micro-explosions.

SUMMARY OF THE INVENTION

This invention provides "tailored" laser light beams and targets for producing laser-target interactions and/or micro-explosions. More particularly, this invention provides means and a method for producing "tailored" laser light beam pre-pulses and main pulses for sequentially interacting the same with a "tailored" target. In one embodiment, the "tailored" target is selectively and variably controlled as to size by a vibrating compression means, and the laser light beam is "tailored" into two different beams of different intensity for sequentially interacting them with the target. In another aspect, the targets are selectively released from a single storage bin by rotating a gate to release one target at a time from the same bin for producing a "tailored" laser-target interaction therefrom. With the proper selection of elements and steps, as described in more detail hereinafter, the desired high temperature plasma is achieved.

The above and further novel features and objects of this invention will appear more fully from the following detailed description when read in connection with the accompanying drawings, and the novel features will be particularly pointed out in connection with the appended claims.

BRIEF DESCRIPTION OF THE DRAWINGS

In the drawings, where like elements are referenced alike,

FIG. 3 is a schematic of a toroidal magnetic well for containment of laser produced plasmas.

DESCRIPTION OF THE PREFERRED EMBODIMENT

Figure 1:
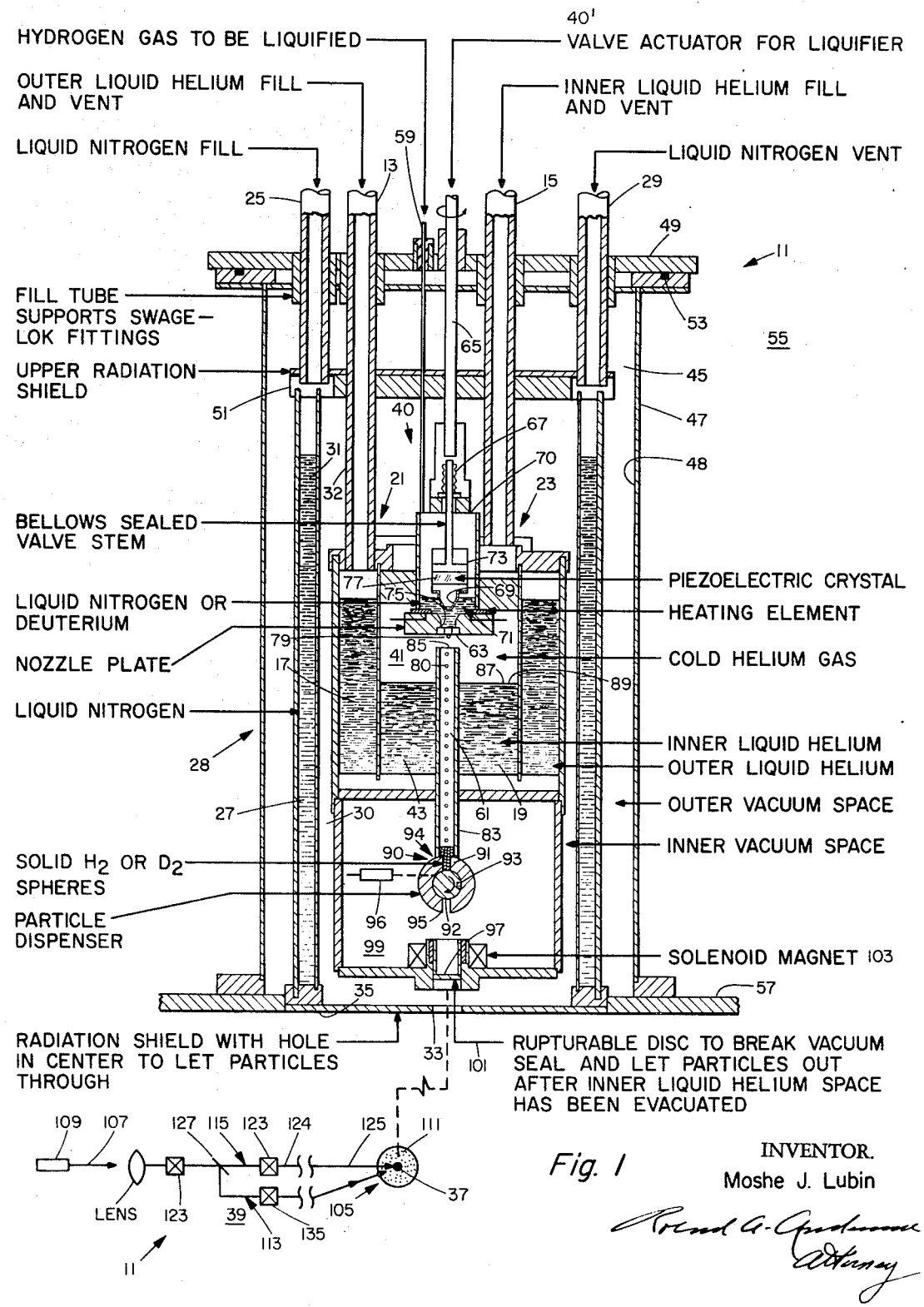
FIG. 1 is a partial cross-section of the target production means of this invention.

This invention is useful in providing high temperature plasmas. As such, this invention is useful in the wide variety of applications to which the heretofore known thermonuclear research reactors and/or plasmas have been used. For example, this invention is useful in producing freely expanding plasmas, and/or laser-target micro-explosions involving fusing nuclei. It is also useful in filling plasma into any of the heretofore known linear and/or closed plasma research reactors, such as stellarators, tokamaks, magnetic mirrors, and/or minimum B and/or minimum average B devices. In this regard, the plasma of this invention can be produced in situ or used for injection purposes. However, as will be understood by one skilled in the art from the following, the apparatus and the method of this invention are not limited to the above-mentioned uses, and this invention can be used in other applications requiring high density target pellets, "tailored" laser light beams, and/or high temperature plasmas. Thus, this invention can be used for providing space propulsion, an X-ray laser, neutron production and "blascons," as understood in the art, and/or it can be used in the fields of magneto hydro-dynamics or power production.

In understanding this invention, it is known from the above-cited patent, as well as from Phys. Fluids 9 (1966) 2047 and Phys. Fluids 5, (1962) 517, that the discovery of high powered lasers and laser amplifiers enables one to achieve by focusing a laser beam, energies and power densities unobtainable in any other way. This is because the focusing of photons is far more effective than that of any other energy carrying entities, owing to both the absence of repulsion between the photons and to the long established and perfected use of suitable well known focusing apparatus, comprising lenses and mirrors that readily receive and bend the beams in any direction, or transmit the beams from place to place as desired. Also, the laser beams can be shortened to from several nanoseconds down to several picoseconds by conventional apparatus. In this regard, it is conventional to obtain such laser light beams having power densities in the range of $10^{10}$ to $10^{17}$ w./cm.$^2$ or more. This invention utilizes any of the conventional lasers described in the above publications. For ease of explanation, however, the preferred emodiment of this invention utilizes the 2.10$^3$ Joule, Nd$^{+3}$ glass, 0.15 nsec. pulse length, 7.10$^{-4}$ cm.$^2$ focus area laser at the University of Rochester. This laser comprises a coaxial series, of parallel, spaced apart, disc-shaped, Nd glass, laser elements that are pumped by suitable flash tubes well known in the art to produce a laser beam output that is readily focused by conventional lenses and bent by conventional mirrors well known in the art. Other suitable equipment may also be used, comprising cryogenic mirrors, conventional laser amplifiers, switches, shutters and other auxiliary equipment which are well known in the art, and since they are well known in the art they are not described herein in more detail.

It is also known in understanding this invention, e.g. from NYO 3578–1 through 12, targets can be irradiated from the above mentioned conventional lasers with from 1 kJ. up to 10 MJ. or more of laser light energy to produce a symmetrically expanding plasma. Additionally, it is known that at least some of this energy can be converted into plasma particle thermal energy in a time of the order of 1 nsec. in a volume of a few cubic millimeters. In this regard, conventional laser produced plasmas known heretofore have had a density $n$ of between about $n=10^{10}$ and $10^{22}$ particles/cm.$^3$, stored energies of 1 kJ./cm.$^3$ and locally sustained pressures of up to $10^3$ atm. or more. The above publications describe the use of conventional lasers to produce such symmetrically expanding plasmas. In this regard these plasmas expand symmetrically-spherically. However, the heretofore known systems have been limited to stored energies of about 1 kJ.cm.$^3$ or less since the expanding plasma has been rapidly cooled by its own expansion.

In this regard also, the expanding plasma rapidly becomes transparent to the incident laser light. This is explained by the fact that the plasma freqeuncy of the target can be decreased from a high value e.g. from a value proportional to the density of the target, to a plasma frequency lower than the frequency of the laser pulse interacting with the target, whereupon the target plasma becomes substantially transparent to the laser light, although refraction, reflection, self-focusing, and in some cases anomolous, dynamic or ionizing effects of the beam on the plasma have been either observed or postulated at or near a point in time when the two frequencies approach or are near the same value.

Another problem involves the heating of the surface of the target, whereby the incident light energy becomes partly dissipated in the surface of the target and partly in the plasma cloud with the ratio therebetween governed by a self-regulating mechanism involving two competing processes corresponding to the plasma opacity and the vaporization rate.

It has now been discovered in accordance with this invention that a "tailored" laser light beam can vaporize a target at acoustic speeds, and then by heat conduction that propagates into the vapor at a much higher speed, the vapor can be turned into a hot plasma. As will be understood in more detail hereinafter, this propagation can be compared to and is faster than the previously known shock waves known heretofore, which as described in the above-cited patent can cause compression. Also, as understood in more detail hereinafter, this heat propagation is depth limited, whereby the target of this invention is also "tailored" so that the intense thermal wave propagation traverses the target diameter.

Referring now to FIG. 1, this invention provides apparatus 11 for producing a "tailored" target for "tailored" laser irradiation in accordance with this invention. To this end, liquid helium enters outer and inner fill tubes 13 and 15 for filling outer and inner chambers 17 and 19 forming coaxial cryostats 21 and 23 respectively. Fill pipe 25 fills chamber 27 with liquid nitrogen to form a Dewar 28 having a vent pipe 29 and a vacuum chamber 30 between coaxial walls 31 and 32. The vacuum pressure in chamber 30 is the same as that in opening 33 in radiation shield 35, which conducts D-T target 37 into target chamber 39. As described in more detail hereinafter, the targets 37 are produced in vibrator-compressor 40 by the apparatus 11 of this invention.

In operation, the space 41 above the liquid helium 43 in inner chamber 19 is evacuated to low pressure, as is chamber 45 formed by shell 47 around the outside of Dewar 28. Also, the shell 47 is formed with suitable reflective super-insulation 48 for efficiently maintaining the nitrogen in the described cryostats and Dewar in liquid form to cool the entire interior of apparatus 11 below top plate 49 and top radiation shield 51. Also, suitable seals 53 provide vacuum tight connections between the inside of apparatus 11 and the ambient 55 that surrounds apparatus 11 above bottom plate 57, the latter forming a vacuum tight enclosure around target chamber 39.

Hydrogen containing gas to be liquified, e.g. deuterium, and/or tritium, enters pipe 59 to fill the bottom of chamber 61 where vibrator-compressor 40 forms the targets 37 one at a time in orifice 63. To this end, a suitable power source rotates to release compressor actuator rod 65 in orifice 63, spring 67 presses the tapered surface 69 of end 71 of piston 73 of compressor actuator 40' against tapered surfaces 75 of orifice 63. Upon entering the cooled chamber 70, the hydrogen introduced to the chamber via pipe 59 liquifies. Piezoelectric crystals 77, which has a suitable electrical energy source and leads, energizes crystal 77 to vibrate the same, whereby liquid hydrogen droplets 79 of a desired size form because of the Raleigh-Taylor instability and drop out of orifice 63.

In actual practice the liquid droplets 79 form spherical solid pellets 80 only when allowed to cool near thermodynamic equilibrium as they fall through the cold helium gas present in drift tube 83. Tube 83 is located in evacuated chamber 19 so that top 85 of tube 83 is above the top 87 of the liquid level 89 of the liquid 43 in chamber 19, so as to supply helium gas to drift tube 83. Thereupon, the pellets accumulate at the bottoms of tube 83 and fill opening 90 in hollow shell 91. Ball 92, which forms a niche 93 in one side thereof, rotates niche 93 to pick-up one pellet 80 at a time from bin 94, which is formed by the combination of tube 83 and opening 90, and to drop this picked-up pellet 80 out through aperture 95, which is formed at the bottom of shell 91. A suitable actuator 96 selectively rotates ball 92 upon command. One suitable actuator, comprises a slow speed motor having microswitches and manual-remote controls for selectively starting and stopping the motor and for picking-up and dropping pellets 80 down and out through aperture 95 at a pre-determined, selectively controlled time.

In operation, rupturable disc 97 closes chamber 99 around shell 91 for evacuating the helium space 41 above the liquid in chamber 19. Suitable electromechanical actuation means 101, which is shown schematically for ease of explanation as a pointed arrow, since it would be understood by one skilled in the art, actuates to rupture disc 97 to drop the particles 80 from chamber 99 through focusing magnet 103 to a desired location 105 in evacuated target chamber 39.

The cold crystal 77 vibrates up and down at about 150 kc./sec. Piston 73 is perturbed by the vibrations. The droplet 79 drops therefrom due to the Raleigh-Taylor instability. The size $\delta$ of the droplets $$79 \approx \frac{1}{\text{freg}^{2/3}} \text{ or } \delta \approx f^{-2/3}$$

whereby the size of the droplet can be controlled within a factor of about 2 by controlling the frequency of crystal 77. The size, shape and density of the solid pellet formed therefrom can still more closely and selectively be controlled to be uniform within a small tolerance by controlling the compression produced by piston 73. Thus, the described combination of vibration and compression in the described environment produces the "tailored" target 37 of this invention at a background pressure of about $10^{-8}$ of Hg. Advantageously, the target 37 has a maximum diameter of 200 microns. The target has a solid density of about $5 \times 10^{22}$ particles/cc.

It will be understood from the above, that the target 37 at location 105 is now ready to be irradiated by a laser light beam 107 that is focused to enter evacuated target chamber 39 from a suitable laser 109. In this regard, it is advantageous first to produce a cold plasma at a solid density of $5 \times 10^{22}$ particles/cc. by vaporization at relatively slow acoustic velocities, and then to turn the vapor into a hot plasma 111 at thermal wave velocities, which are much faster than shock waves to produce a spherical, freely expanding, high temperature plasma 111 that is expanding at its acoustic velocity. In this regard, the solid to vapor/stage is slow, but the vapor to plasma stage is fast whereby the plasma 111 is heated by an intense laser light beam with so much laser light energy (from at least $10^{10}$ to $10^{17}$ w./cm.$^2$ or more, and advantageously is in one example of the preferred embodiment at $10^{14}$ w./cm.$^2$) in so short a time (from several pico-seconds up to a maximum of only about a few nanoseconds) in a small space of only up to a few millimeters, that the plasma 111 spherically and freely expands in the form of a plasma 111 having a temperature of at least 1 kev. before it has a chance to become unstable. In this regard, the plasma 111 expands so fast that it cannot expand any faster. In other words, it runs downhill thermodynamically as fast as it can. Plasma 111 advantageously has a density $n$ of at least $10^{17}$ particles/cm.$^3$ at stored energies of at least 1 kJ./cm.$^3$ and locally sustained pressures of at least $10^3$ atm. In this regard, the plasma 111 stays together for a time $\tau$, whereby at a temperature of 10 kev., $n\tau=10^{14}$. As is evident from Eq. 4 on page 212 of "Nuclear Fusion," 10 (1970), $$\tau = \frac{r}{V_s}$$

where $r$ is the radius of plasma 111 and $V_s$ is the plasma expansion speed. The lower left hand part of FIG. 1 will be understood by reference to FIG. 2.

Figure 2:
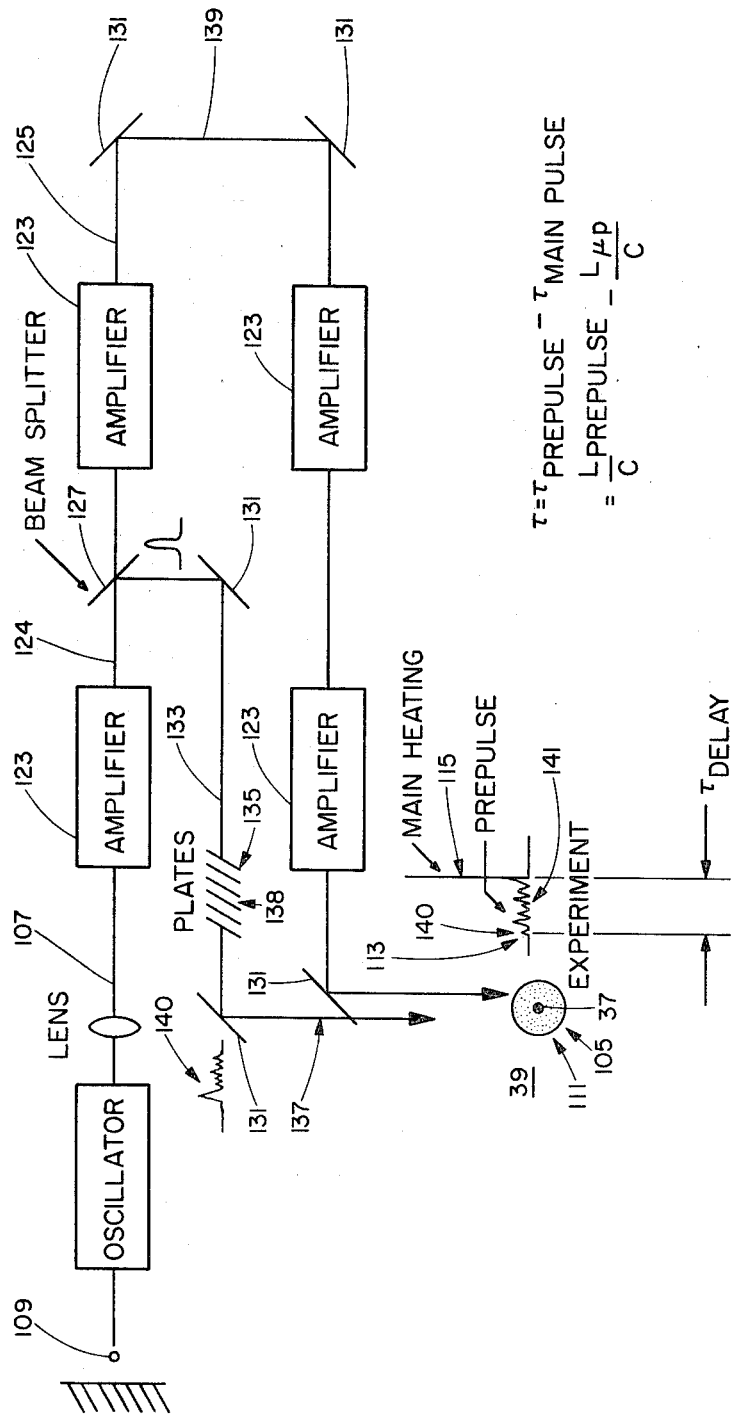
FIG. 2 is a partial schematic illustration of the tailored laser light beams and apparatus of this invention.

Referring now to FIG. 2 the laser light beam 107 from laser 109 is "tailored" to vaporize target 37 to a state bordering and just up to a fully ionized state, which is a relatively slow acoustic phenomenon, and then to heat the plasma by heat conduction that propagates into the target 37 at a faster rate than the previously known shock waves, as described above. To this end, the beam 107 is "tailored" to produce a relatively long relatively low intensity, laster pre-pulse 113 and a relatively short, high intensity, main pulse 115. Advantageously, in one example, the pre-pulse 113 lasts for about 2 to 3 nanoseconds, and the main pulse lasts for only up to about $10^{-10}$ seconds. Also, the pre-pulse has a small amplitude and intensity, which is just enough to produce the described acoustic phenomena. This is determined by the described target parameters, whereby the pre-pulse in one example is a few kilo-watts/cm.$^2$, and the main pulse is $10^{14}$ w/cm.$^2$, although higher intensity main pulses may also be used. It will also be understood, however, that the pre-pulse 113, as well as the main pulse 115, can be selectively varied sequentially to impact against target 37 at a desired time in accordance with this invention. To this end, the impact times, can be selectively varied from a pico-second apart ($10^{-12}$ second) up to over a nanosecond apart ($10^9$ second) and vice-versa by selectively varying the path lengths of the laser light beam, as described in more detail hereinafter, it being understood in the art that light travels about 30 cm./nanosecond.

In one embodiment, laser 109 comprises a conventional laser system for producing the initial "untailored" beam 107. Any conventional laser, such as those described in the above-cited patents, can be used. Also, the lasers and controls can be used that are described in U.S. Pat. 3,543,289, and USAEC reports NYO 3578–1 through NYO 3578–12, or MIT 3980–45. In this regard rod-shaped, ruby or glass, laser cores, or $CO_2$ lasers can be used. Also, conventional helically wound excitation or other flash tubes surrounding and illuminating or otherwise energizing the cores can be used. Likewise, suitable laser amplifiers, housings, trigger electrode elements, switches and shutters may be used. One suitable shutter is described in U.S. Pat. 3,519,328 by Grossman, entitled "Short Duration Optical Shutter" which employs a Kerr cell for adjusting the pulse width and timing of a laser beam, like beam 107. Advantageously, however, laser 109 is the $2.10^3$ Joule, $Nd^{+3}$ glass, 0.15 nsec. pulse length, $7.10^{-4}$ cm.$^2$ focus area laser at the University of Rochester. This laser comprises a coaxial, parallel, series of disc-shaped Nd glass laser elements that are spaced from each other and pumped by conventional excitation means to oscillate light between conventional partially silvered reflective surfaces to produce a laser beam 107 that can be readily focused, amplified, and bent by conventional means. To this end, conventional high quality lenses and silvered or gold or copper coated cryogenic mirrors having reflectivities of 98% or more are advantageously used. For ease of explanation, amplifiers 123 are a series of concentional amplifiers that receive and amplify the intensity of beam 107 in a well known manner, it being understood that there is a space between at least two of the amplifiers 123 for splitting off a portion of the amplified laser light beam pulse 124 therebetween in accordance with this invention. Also, each amplified laser beam, i.e. beam 107, 124, 125, etc., corresponds in intensity and pulse width to initial beam 107 and is derived therefrom.

In accordance with this invention the beam splitter 127 splits off a portion of the amplified laser light beam pulse 124 from first amplifier 123 and a series of mirrors 131 conducts the split beam 133 through an etalon 135, and from the etalon in a pre-pulse path 137 to the target 37 prior to the arrival of the main laser pulse 115 at the target 37.

Advantageously, the etalon 135 comprises a series of stacked flat glass plates arranged at a small angle, advantageously $<1°$, to a plane normal to the pre-pulse produced by beam splitter 127. In this regard, the portion 138 of pre-pulse 113 is reflected back and forth in the etalon 135, and each time the light is reflected in the etalon a small portion of the light passes through the etalon to the target 37. This also has the advantage of producing a jagged amplitude pulse 138, such as shown in FIG. 2.

In the operation of one example of this invention, the laser used is a laser system for producing both "tailored" pre-pulses and higher energy main pulses, and sequentially directing them against the target 37.

In this regard, the length of the longer path 139 of the main "tailored" laser heating pulse 115 causes the main pulse 115 to arrive at the target 37 after the pre-pulse 113 arrives at target 37. Also, the etalon 135 spreads the pre-pulse waveform amplitudes into the jagged, uniform amplitude, many peaked, waveform 140 shown in FIG. 2, while the length of the pre-pulse path 137 controls the leading edge thereof to arrive at the target 37 at the proper time.

The above has described a system for producing a freely expanding plasma, by the use of "tailored" laser pre-pulses 113 and main pulses 115, and a "tailored" high density target 37. It is likewise understood that this invention contemplates the production of micro-explosions involving fusing nuclei in plasma 111. However, this requires a very large intensity main pulse 115 for heating the plasma in a short time before the plasma cools by expansion. Accordingly, it will be understood in accordance with this invention, that the plasma 111 can be heated sufficiently by a strong main pulse. Increased neutron yields are obtained when the plasma free expansion is attenuated. One way of attenuation is the conventional minimum B magnetic field, such as has been used heretofore in thermonuclear research to increase the confinement time of the plasma 111. One such magnetic field is the minimum B field produced by a "baseball seam" shaped winding around target 37 at location 105, such as is actually being used at the University of Rochester.

For a freely expanding plasma 111 produced from target 37 of the order to 50 to 200 microns in diameter, the radiation time of the described intense thermal wave produced by the main pulse 115 to achieve maximum propagation thereof in target 37, is about $10^{-10}$ second.

Also, the amplification process produces a jagged waveform like that of the pre-pulse but of increasing amplitudes in the sharply peaked pulse envelope 141 shown in FIG. 2. With an externally applied magnetic confining field, the plasma confinement time can be increased in correspondence with the strength of the magnetic field. In this regard, the field strength produced by conventional minimum $\beta$ coils such as the described "baseball seam" shaped coil, is advantageously at a uniform field strength from 50 to 150k gauss. To this end, a suitable copper, "baseball seam," magnetic field winding is cooled to liquid nitrogen temperatures in a conventional cryostat having ports for impacting the laser beam 107 against the target 37 at a location 105 that is located at the center of this cooled copper winding, such as described in the below-mentioned 1968 Novosibirsk conference papers.

It will be understood from the above that the stored plasma energy density can be increased above 1 kev. by the described laser system of this invention alone, or in combination with the described minimum $\beta$ magnetic field. In both embodiments the vaporized pellet 37, is not in a liquid or solid state, but is in its cold, plasma disassembled state having ions and electrons at solid density, i.e. at $5 \times 10^{22}$ particles/cc.². Also, in both cases the vaporized pellet 37 is heated quickly by thermal conduction by a large intensity main pulse to form a freely expanding plasma or a plasma that expands against a minimum $\beta$ field.

In another embodiment a minimum average $\beta$ field may be used. Here the minimum average $\beta$ field is suitable for plasma injection. One suitable minimum $\beta$ producing field apparatus is the multipole described by M. Roberts et al., in CN-23/C4, "Third Conference on Plasma Physics and Controlled Fusion Res.," Novosibirsk, 1968. Another is the levitated spherator at Princeton University. Another suitable multipole is the periodic quadrupole described and shown in FIG. 4(a) by Furth on page 82 of Advances in Plasma Physics, vol. I, Simon Thompson (Editors), Interscience publishers, John Wiley and Sons, N.Y., 1968. Still another is the quadrupole at the University of Rochester, although closed toroidal devices, such as the C stellarator described in U.S. Pats. 3,278,384; 3,171,788; 3,088,894; 3,016,341 or 3,015,618 or the tokamak derived therefrom may alternately be used. The magnetic fields produced by the latter closed devices have the advantage that several well known plasma heating means well known in the art in connection with conventional magnetic plasma confining fields may be used in combination with the described laser target system to increase the plasma temperature up to from 1 kev. to 10 kev. These conventional heating systems, comprise combinations of the above laser heating with ion cyclotron resonance heating, ohmic heating, pinch heating, adiabatic heating, micro-wave heating, feed back heating, or anomalous laser heating. The latter occurs, for example, when the laser frequency and plasma frequency are about the same and/or approach the same frequency. Also, neutral beam injection may be used in any of the mentioned embodiments.

In the multipole embodiment shown in FIG. 3, which schematically illustrates conventional laser beam transporting elements such as lenses well known in the art, current carrying loops 151 and 153 of endless OFHC copper rods 1.27 cm. and 1.58 cm. diameters, advantageously form coaxial welded rings 155 and 157 of 29.2 and 49.8 cm. diameters respectively in a minimum average $\beta$, toroidal closed embodiment. The rings are suspended by suitable means. One means is the levitating system disclosed in U.S. Pat. 3,512,852, but suitable stainless steel wire supports may alternately be used, as is done at the University of Rochester quadrupole as described in Annual Progress Report UR-4054-6. The evacuated toroidal confining tube 159, is conventional. Advantageously, the rings 155 and 157 as well as torus 159 are cooled in a Dewar or cryostat by circulating liquid nitrogen through a series of copper pipes welded to the torus. Additionally, a suitable transformer 161 produces currents in the chamber 163, while the plasma injects into chamber 163 at location 105 by using the described laser 109.

The primary winding loops 155 and 157 are advantageously driven from a capacitor bank of 5800 microfarads rate at 3 kv., which switches into these primary winding loops from an ignitron "crow-bar" switch as is conventional. In a back biased condition, a second like capacitor bank doubles the current capability of the primary winds.

Electron cyclotron resonance means 171 is conventional. The heating produced thereby, is determined by using a modulated X-band klystron followed by a narrow band, high power amplifier (10.368 Kmc.). Continuously variable pulse widths are available, extending up to CW operation at a peak power adjusted from zero to 1 Kwatt, at 300 second pulse widths, at variable powers. However, a laser diagnostic beam 172 directed through port 173 from laser 175 also can be detected by a suitable interferometer 177.

In operation the above described University of Rochester or other laser or a $1.5 \times 10^9$ watt ruby laser injects the described "tailored" pre-pulse and main pulse against target 37 at location 105 in a suitable chamber, such as chamber 163, at the radiation power densitites used to create the described hydrogen plasma 111. In the quadrupole embodiment 179 of FIG. 3, the time of pre-pulse vaporization of the solid hydrogen target 37 is determined primarily by the time of propagation of the intense longitudinal wave through the target 37. As described above, for targets 37 of the order of 50 to 200 microns radius this time is of the order of $10^{-10}$ seconds. Most of the energy that exceeds the vaporization energy in a time less than this will be lost for future heating of the plasma. Thus, the criterion of this invention for efficient laser energy coupling to the plasma 111, is met by impacting a 2 to 3 nanosecond low intensity, leaked, burst of light from laser 109, followed by a main, fast rise time, heating pulse of a duration determined by the absorption history of the expanding plasma 111.

The size of the target 37 falling into the focal column of a laser 109 is measured by its far field diffraction pattern when illuminated by a well collimated CW He-Ne laser beam. Measurement of the target velocity then programs the laser to fire when the target 37 enters the focal volume of laser 109. The velocities of targets 37 through apertures 189 is controlled by applying a retarding potential to the last two apertures 187. Since the targets 37 come from vibrator compressor 40 with a constant potential (−40 v.), the biased apertures act as a lens system that focuses as well as retards the fall of the targets 37.

This invention has the advantage of producing tailored laser pulses and tailored targets for producing laser-target interactions, high temperature plasmas, and micro-explosions. The tailored target means of this invention, has the advantage of controlling the size, shape, density and release of the target, which is produced by a vibrator-compressor. The tailored laser beam, has the advantage of providing a sequential pre-pulse that vaporizes a target, and a main pulse that rapidly produces a plasma therefrom that can be freely expanded or expanded against a vacuum magnetic field by production in situ or injection thereinto.

What is claimed is:

1. Plasma production apparatus, comprising first means for producing a spherical target, means for controlling the size and density of said target, and tailored laser light pulse producing means for producing and heating a plasma from said target by sequentially impacting said target with laser light pulses that are tailored to vaporize said target and to produce a plasma therefrom in accordance with the size and density of said target, and said heating of said plasma, said tailored laser light pulse producing means, comprising a laser for producing a first laser light beam, means for splitting said first laser light beam into two different laser light beam pulses, and means for conducting said two different laser light beam pulses over two different paths for effecting the sequential impacting of said latter two pulses against said target in accordance with the length of said two different paths, said means for splitting said first laser light beam into two different laser light beam pulses, comprising a beam splitter for leaking a portion of said first laser light beam into one of said paths, and reflecting the remaining portion of said first laser light beam into the other of said paths, said one path having means for amplifying the amplitude and intensity of said one of said pulses, and said other of said paths having means for widening the pulse width of said other of said pulses and producing a plurality of substantially uniform, low amplitude peaks therein.

2. The invention of claim 1 in which said first means compresses said hydrogen to produce a solid target.

3. The invention of claim 1 having a bin for storing a plurality of said targets, and means for releasing them one at a time from said bin.

4. The invention of claim 3, wherein said means for releasing said targets, comprises a shell and a ball forming a niche rotatable in said shell for picking up said targets from said bin one at a time, and releasing them from said niche one at a time.

5. The invention of claim 1 in which said first means has cryostatic cooling means for producing solid D-T targets, and means for selecting, guiding, and selectively releasing said targets to be impacted by said tailored laser light pulses in the focal volume of said pulses.

6. Apparatus for producing a plasma from a target, comprising laser light pulse producing means for producing and heating a plasma from said target by sequentially impacting laser light pulses against said target to vaporize said target and to produce a plasma therefrom in accordance with the size and density of said target, said laser light pulse producing means having a laser for producing a first laser light beam, means for splitting said first laser light beam into two different laser light beam pulses, and means for conducting said two different laser light beam pulses over two different paths for effecting said sequential impacting of said latter two pulses against said target in accordance with the length of said two different paths, said means for splitting said first laser light beam into two different laser light beam pulses, comprising a beam splitter for leaking a portion of said first laser light beam into one of said paths, and reflecting the remaining portion of said first laser light beam into the other of said paths, said one path having means for amplifying the amplitude and intensity of said one of said pulses, and said other of said paths having means for widening the pulse width of said other of said pulses and producing a plurality of substantially uniform, low amplitude peaks therein.

7. Plasma production apparatus, comprising first means for producing a spherical, hydrogen containing target having a hydrogen source, and a vibrator and a compressor for effecting the size and density of said target in accordance with the vibration and compression of said hydrogen, and tailored laser light pulse producing means for producing and heating a plasma from said target by sequentially impacting said target with laser light pulses that are tailored to vaporize said target and to produce a plasma therefrom in accordance with the size and density of said target, and said heating of said plasma, said tailored laser light pulse producing means, comprising a laser for producing a first laser light beam, means for splitting said first laser light beam into two different laser light beam pulses, and means for conducting said two different laser light beam pulses over two different paths for effecting the sequential impacting of said latter two pulses against said target in accordance with the length of said two different paths, said means for splitting said first laser light beam into two different laser light beam pulses, comprising a beam splitter for leaking a portion of said first laser light beam into one of said paths, and reflecting the remaining portion of said first laser light beam into the other of said paths, said one path having means for amplifying the amplitude and intensity of said one of said pulses, and said other of said paths having means for widening the pulse width of said other of said pulses and producing a plurality of substantially uniform, low amplitude peaks therein.

8. The apparatus of claim 6 in which said means for widening the pulse width of said other of said pulses and producing a plurality of substantially uniform, low amplitude peaks therein forms a laser pre-pulse of relatively low intensity and wide pulse width for effecting the vaporization of a solid target at an acoustic velocity to produce a cold plasma of disassembled ions and electrons substantially at a high density above $10^{21}$ particles/cc. in accordance with the size, shape and density of said target, and the acoustic velocity of said vaporization process, and said means for amplifying the amplitude and intensity of said one of said pulses produces a laser main pulse of relatively high intensity, sharp rise time, and narrow pulse width for heating said vaporized target for effecting the production of a hot plasma from said vaporized target in accordance with the production and propagation of thermal waves into said cold plasma by said laser main pulse.

9. The apparatus of claim 6 having means for producing said target, comprising cryogenic means having a vibrator and a compressor for producing said target in a predetermined solid size, and said apparatus has means for selectively storing said targets in a bin, and means for selectively releasing said targets from said bin one at a time and directing them to impact against pulses at a predetermined time and location.

10. The method of sequentially impacting a solid target with tailored laser light beams of different intensity to produce a high temperature plasma, comprising the steps of producing a laser light beam, splitting said laser light beam into two different laser light beam pulses, transporting said two different laser light beam pulses over two different paths of different lengths for effecting said sequential impacting of said latter two pulses against said target at different times in accordance with the lengths of said two different paths, amplifying the intensity of said pulse in the longer of said paths, and passing the pulse in the shorter of said paths through an etalon for widening the width of said pulse for effecting the production of said plasma in accordance with the pulse width and intensity of said sequential impacting of said pulses against said target.

References Cited

UNITED STATES PATENTS

| | | | |
|---|---|---|---|
| 3,378,446 | 4/1968 | Whittlesey | 176—1 |
| 3,445,333 | 5/1969 | Lecomte | 176—1 |
| 3,489,645 | 1/1970 | Daiber et al. | 176—1 |

REUBEN EPSTEIN, Primary Examiner

U.S. Cl. X.R.

62—514; 219—121 L, 121 LM; 331—94.5